(12) United States Patent
Karatay et al.

(10) Patent No.: US 11,909,052 B2
(45) Date of Patent: Feb. 20, 2024

(54) FABRICATION OF MEMBRANE ELECTRODE ASSEMBLY WITH FILAMENT EXTENSION ATOMIZER SPRAY

(71) Applicant: Palo Alto Research Center Incorporated, Palo Alto, CA (US)

(72) Inventors: Elif Karatay, Mountain View, CA (US); Kathryn F. Murphy, Redwood City, CA (US)

(73) Assignee: XEROX CORPORATION, Norwalk, CT (US)

( * ) Notice: Subject to any disclaimer, the term of this patent is extended or adjusted under 35 U.S.C. 154(b) by 184 days.

(21) Appl. No.: 17/364,163

(22) Filed: Jun. 30, 2021

(65) Prior Publication Data

US 2023/0006217 A1 Jan. 5, 2023

(51) Int. Cl.
| | |
|---|---|
| *H01M 4/88* | (2006.01) |
| *H01M 8/1004* | (2016.01) |
| *H01M 8/1081* | (2016.01) |
| *B05B 3/04* | (2006.01) |
| *H01M 4/86* | (2006.01) |
| *H01M 8/10* | (2016.01) |

(52) U.S. Cl.
CPC ......... *H01M 4/8825* (2013.01); *B05B 3/0409* (2013.01); *H01M 4/8642* (2013.01); *H01M 4/881* (2013.01); *H01M 4/8807* (2013.01); *H01M 8/1004* (2013.01); *H01M 8/1081* (2013.01); *H01M 4/886* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 10,493,483 B2 | 12/2019 | Johnson | |
| 10,953,425 B2 | 3/2021 | Unidad et al. | |
| 2007/0026291 A1* | 2/2007 | Kim | H01M 8/1067 |
| | | | 429/513 |
| 2014/0154610 A1* | 6/2014 | Murakami | H01M 8/1025 |
| | | | 521/27 |
| 2015/0115057 A1 | 4/2015 | Beck | |
| 2015/0119477 A1 | 4/2015 | Beck | |
| 2015/0210009 A1 | 7/2015 | Johnson | |
| 2015/0343407 A1 | 12/2015 | Johnson | |

(Continued)

FOREIGN PATENT DOCUMENTS

| | | | |
|---|---|---|---|
| JP | 2007-214008 | * | 8/2007 |
| KR | 20150070577 | * | 6/2015 |

OTHER PUBLICATIONS

David M. Johnson, et al., "Polymer Spray Deposition: A Novel Aerosol-Based, Electrostatic Digital Deposition System for Additive Manufacturing," Proc. 27th Annual Intern'l Solid Freeform Fabrication Symp., pp. 1594-1603 (2019).

*Primary Examiner* — Jonathan Crepeau
(74) *Attorney, Agent, or Firm* — Lippes Mathias LLP

(57) ABSTRACT

A method and apparatus are described for forming a multilayer assembly. The method includes adhering first and second catalyst layers to opposed sides of a polymer membrane. At least one of the first catalyst layer, the second catalyst layer, and the polymer membrane is formed by filament extension atomization of a fluid material to form atomized droplets that are sprayed to form the respective membrane or layer.

15 Claims, 8 Drawing Sheets

(56) References Cited

U.S. PATENT DOCUMENTS

| | | |
|---|---|---|
| 2015/0343468 A1 | 12/2015 | Johnson |
| 2015/0343477 A1 | 12/2015 | Johnson |
| 2016/0175856 A1 | 6/2016 | Paschkewitz |
| 2016/0175874 A1 | 6/2016 | Beck |
| 2017/0203326 A1 | 7/2017 | Johnson |
| 2017/0203504 A1 | 7/2017 | Johnson |
| 2017/0203505 A1 | 7/2017 | Johnson |
| 2018/0053958 A1* | 2/2018 | Serov .................. H01M 4/8605 |
| 2018/0257103 A1 | 9/2018 | Johnson |
| 2019/0015862 A1 | 1/2019 | Johnson |
| 2019/0030559 A1 | 1/2019 | Neelakantan |
| 2019/0111446 A1 | 4/2019 | Johnson |
| 2020/0212466 A1 | 7/2020 | Murphy |
| 2023/0163314 A1* | 5/2023 | Xu ...................... H01M 8/1018<br>429/480 |

\* cited by examiner

FABRICATION OF MEMBRANE ELECTRODE ASSEMBLY WITH FILAMENT EXTENSION ATOMIZER SPRAY

BACKGROUND

The exemplary embodiment relates to an apparatus and method for forming a multilayer assembly and a membrane electrode assembly which includes the multilayer assembly. It finds particular application in connection with a filament extension atomizer for forming an ionomer-containing layer.

A membrane electrode assembly (MEA) is generally a layered structure in which a freestanding polymer electrolyte membrane, formed from an ion-permeable ionomer, is sandwiched between catalyst layers. The catalyst layers may also include some ionomer for continuity of ion transport. This triple-layered assembly is sandwiched between two porous gas transport layers, formed, for example, from carbon or titania.

To provide bonding between the layers of the MEA, the layers may be hot pressed together. The conventional hot pressing method does not achieve a good interfacial contact and is prone to various problems. For example, delamination tends to occur. Additionally, unevenness due to catalyst particle agglomeration can puncture the membrane. To remedy this problem, membranes thicker than required are used. Besides, this conventional assembly process limits the MEA design to layered structure which limits the design space.

Existing methods for constructing the catalyst layers include a gas diffusion electrode (GDE) method and a catalyst coated membrane (CCM) method. In the GDE method, a catalyst layer (CL) is formed on a preformed gas diffusion layer (GDL), by spraying or screen printing, to form a GDE. A polymer electrolyte membrane (PEM) is then sandwiched between two GDEs and the assembly is hot-pressed to form a MEA. The GDL is electrically conductive and serves as part of an electrode. One problem with the GDE method is that the interface between the CL and the PEM can be weak, resulting in delamination and reduced durability of the MEA. The poor interfacial contact can lead to lower charge transport and a lower electrochemical performance.

In the CCM method, CLs are formed on both sides of a PEM by directly spray coating the membrane or using a decal transfer method with the catalyst ink, to form a CCM. This method provides good interfacial contact, in comparison to the GDE method. One problem with the CCM method is that conventional sprayers can only spray low ionomer content solutions, due to the strain hardening nature and high viscosity of ionomer solutions. Spraying particles using conventional nozzles is limited due to possible clogging issues. The direct spray coating methods are limited to low viscosities (generally less than 40 mPa·s-check) and low particle loading (generally less than 2 wt. %).

The exemplary system and method employ a filament extension atomizer (FEA) spray, which allows spraying solutions with high polymer concentrations, and also allows spraying of molten polymers.

INCORPORATION BY REFERENCE

The following references, the disclosures of which are incorporated by reference in their entireties, are mentioned:

U.S. Pat. No. 10,493,483 B2, issued Dec. 3, 2019, entitled CENTRAL FED ROLLER FOR FILAMENT EXTENSION ATOMIZER, by Johnson, describes an atomization system includes a fluid reservoir and a pair of rollers. At least one of the rollers has a central feed channel, which is fluidly connected to the fluid reservoir. A surface of the roller has an array of holes which are connected to the channels. In use, liquid exits the holes and is stretched by the counter-rotating rollers to form filaments, break into droplets and are received on a receiving surface.

U.S. Pub. No. 20170203326 A1, published Jul. 20, 2017, entitled SYSTEM AND METHOD FOR COATING A SUBSTRATE, by Johnson, et al., and U.S. Pub. No. 20180257103 A1, published Sep. 13, 2018, entitled SYSTEM AND METHOD FOR COATING A SUBSTRATE, by Johnson, et al., describe systems and methods for coating a substrate. A powder coating material is prepared and deposited onto a substrate using a filament extension atomizer. The filament extension atomizer stretches fluid filaments of the powder coating material to form droplets of powder coating material. The droplets of powder coating material are partially cooled to prevent agglomeration and to form a powder coating material. The cooled powder coating material is deposited on a substrate and cured to form a cohesive film of coating material across the substrate.

U.S. Pub. No. 20190030559 A1, published Jan. 31, 2019, entitled PRESSURE INDUCED SURFACE WETTING FOR ENHANCED SPREADING AND CONTROLLED FILAMENT SIZE, by Neelakantan, et al., and references cited therein, describes a roller, which includes a cylindrical outer surface of a hydrophobic material, an inner core of a hydrophilic material, and an inhomogeneous geometric pattern of grooves in the surface that expose the hydrophilic material.

David M. Johnson, et al., "Polymer Spray Deposition: A Novel Aerosol-Based, Electrostatic Digital Deposition System for Additive Manufacturing," Proc. 27th Annual Intern'l Solid Freeform Fabrication Symp., pp. 1594-1603 (2019), describes patterning with thermoplastics for additive manufacturing.

Methods of forming aerosols from filaments are described in U.S. Pub. Nos. 20150119477, 20150343477, 20150115057, 20150210009, 20150343468, 20160175856, and U.S. Pat. No. 9,257,056, for example.

U.S. Pub. No. 20200212466, published Jul. 2, 2020, entitled APPARATUS AND METHOD FOR FORMING A MULTILAYER EXTRUSION COMPRISING COMPONENT LAYERS OF AN ELECTROCHEMICAL CELL, by Murphy, describes a co-extrusion method for forming component layers of an electrochemical cell with a coextrusion die using metallic inks and a polymeric ink.

BRIEF DESCRIPTION

In accordance with one aspect of the exemplary embodiment, a method for forming a multilayer assembly includes adhering first and second catalyst layers to opposed sides of a polymer membrane, wherein at least one of the first catalyst layer, the second catalyst layer, and the polymer membrane is formed by filament extension atomization of a fluid material to form atomized droplets that are sprayed to form the respective membrane or layer.

In accordance with another aspect of the exemplary embodiment, an apparatus for forming a multilayer assembly includes a first filament extension atomizer which generates an aerosol from a first catalyst layer forming material in fluid form, by stretching the fluid material in a nip defined between rotating rollers. A first applying station receives the aerosol, the first applying station including outlets which deposit droplets of the aerosol on a substrate to form a first catalyst layer, the substrate comprising one of a microporous layer and a polymer membrane. The first applying station, or a second applying station, applies the other of the microporous layer and the polymer membrane to the first catalyst layer.

In accordance with another aspect of the exemplary embodiment, a method for forming a multilayer assembly includes providing a polymer membrane, forming a first catalyst layer on the polymer membrane by filament extension atomization of a first catalyst layer material to form atomized droplets that are sprayed on the polymer membrane to form the first catalyst layer. The first catalyst layer material includes a polymer and catalyst particles. The polymer and catalyst particles together account for at least 20 wt. % of the first catalyst layer material. The method further includes adhering a first microporous layer to the first catalyst layer and curing first catalyst layer material.

DETAILED DESCRIPTION

Aspects of the exemplary embodiment relate to a method of making a multilayer membrane assembly, a method of making an electrochemical device incorporating the multi-layer membrane assembly, and to a method employing the device.

The exemplary system and method employ a filament extension atomization (FEA) device, which allows spraying solutions with high polymer concentrations, and also allows spraying of molten polymers (ionomers). Spraying molten polymers avoids the need for dispersing the polymer in a suitable solvent and for handling such solvents.

The exemplary FEA method is able to spray a wide range of high viscosity/strain hardening fluids, which enables fabrication of one or more layers of a multilayer membrane assembly, such as a Polymer Electrolyte Membrane (PEM) layer, and/or one or more catalyst layers. Fabricating the membrane with conventional sprayer to fabricate the membrane generally requires multiple passes, and thereby more time and resources. The FEA spray allows a simplified fabrication method and provides design flexibility as compared to conventional methods. The FEA spray method also allows a high loading of other deposited materials, such as catalyst particles in the catalyst layer(s). This capability provides a potential design space also enabling graded ionomer/catalyst structures. The gradient design with higher catalyst loading and/or ionomer content near a polymer electrolyte membrane increases the contact area with an electrolyte and shortens the proton transport path.

Figure 1:
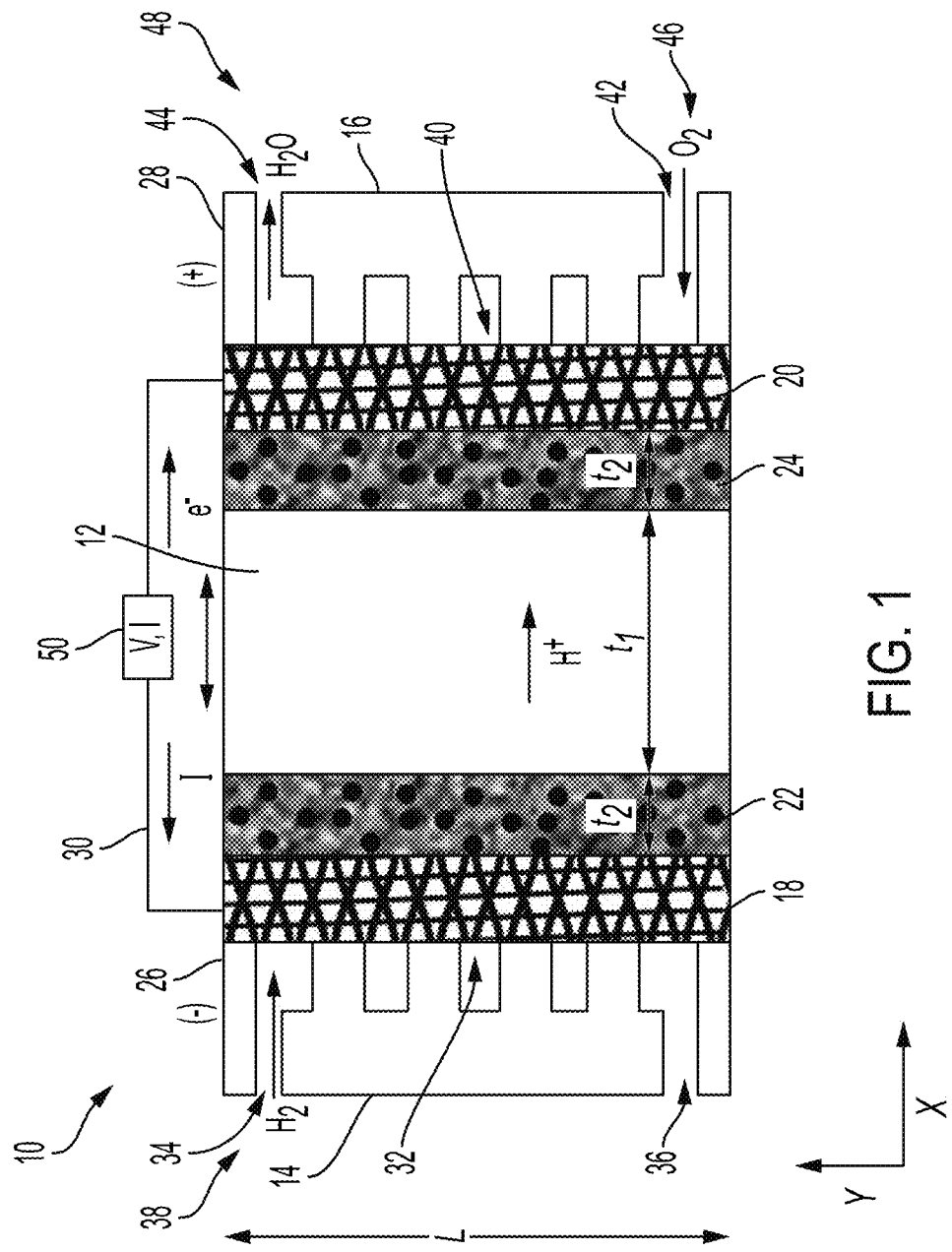
FIG. 1 is a schematic cross sectional view of a membrane electrode assembly in accordance with one aspect of the exemplary embodiment.

With reference to FIG. 1, an exemplary electrochemical device 10 in the form of a membrane electrode assembly (MEA) is shown in cross-sectional view. The MEA device 10 includes a membrane layer 12, which may be generally planar, first and second bipolar plates 14, 16, first and second gas diffusion layers 18, 20, first and second catalyst layers 22, 24, and first and second electrodes 26, 28, such as an anode and a cathode. The exemplary gas diffusion layers 18, 20 are electrically-conductive and serve as extensions of the electrodes. A conductive path 30 electrically connects the first and second electrodes 26, 28, permitting a flow of electrons between the first and second electrodes. In a typical fuel cell system, multiple MEA, devices such as MEA 10, are electrically connected in a series or parallel configuration, referred to as a fuel cell stack, to generate electrical power at a predetermined current and voltage.

A first chamber 32 is defined by channels between the first bipolar plate 14 and the first gas diffusion layer 18. The first chamber 32 has an inlet port 34 and an outlet port 36, allowing a first fluid 38 to flow through the chamber. A second chamber 40 is defined by channels between the second bipolar plate 16 and the second gas diffusion layer 20. The chamber 40 has an inlet port 42 and an outlet port 44, allowing a second fluid 46 to flow through the second chamber. One or more gaskets (not shown) may be used to seal the MEA 10 to inhibit leakage of the fluid(s). As will be appreciated, multiple MEAs 10 may be stacked in parallel, with the first bipolar plate 14 of one MEA serving as the second bipolar plate 16 of a second MEA, for example.

The MEA of FIG. 1 is configured for use in a fuel cell device. The fuel 38 may be (predominantly) hydrogen gas. The first catalyst layer 22 converts the hydrogen to hydrogen ions, which pass through the membrane 12. The membrane layer 12 in this case, is a polymer electrolyte which is proton-permeable, i.e., configured to enable protons ($H^+$) to travel from the anode 26 to the cathode 28, while preventing the free electrons $e^-$ from traveling through the membrane layer.

Hydrogen ions reaching the second catalyst layer 24 combine with oxygen (e.g., in air) 46 to form water 48, which is drawn out of the second chamber as the air 46 is replenished. Electrons, generated by the ionization of hydrogen, pass along the conductive path 30 between the electrodes and charge the conductive path to charge a load cell 50.

In another embodiment, not shown, the device 10 may be similarly configured for use as an electrolyzer device. In this embodiment, the reactions are essentially reversed. Water is fed to the cathode chamber, where it is converted to hydrogen ions and oxygen by the second catalyst layer 24. The hydrogen ions pass through the proton-permeable membrane layer 12 to the anode chamber 32. Oxygen gas exits the cathode chamber 40 via port 44 and may be collected in a suitable vessel (not shown). Hydrogen ions reaching the catalyst layer 22 are reduced to hydrogen gas 38, which passes out of the chamber 32 through a port 34 and may be collected in a suitable vessel (not shown). Electrons, generated by the decomposition of water, pass along the conductive path 30 between the electrodes 28, 26 via the load cell 50, which provides additional current to drive the reaction.

In the electrochemical device 10, one or more of layers 12, 22, 24 is formed by filament extension atomization (FEA) as a multilayer assembly 60, which optionally includes additional layers of the MEA.

The gas diffusion layers 18, 20 may be microporous layers, e.g., formed from multiple plies of carbon paper, woven carbon cloths, non-woven carbon fiber, mesh, web, or formed from another microporous base material, such as titanium. The base material may be modified with a particulate material either embedded within the base material or coated onto the planar faces, or a combination of both. The particulate material may be a mixture of carbon black and a polymer such as polytetrafluoroethylene (PTFE). The gas diffusion layers 18, 20 may be between 100 and 300 µm thick. In one embodiment, the gas diffusion layers 18, 20 are electrically conductive. The gas diffusion layers serve to reduce hot spots and distribute the fuel (hydrogen or water).

The first and second electrodes 26, 28 may be formed from palladium, platinum, carbon (e.g., graphite), or other electrically-conductive material.

The first and second bipolar plates 14, 16 may be formed from a corrosion resistant metal or alloy, such as stainless steel, aluminum alloys, titanium alloys, nickel alloys, copper alloys, and metal-based composites. Carbon-based materials, such as graphite or Buckminster fullerene may also be used. In one embodiment, the bipolar plates 14, 16 are electrically conductive and serve as extensions of the anode and cathode 26, 28. The bipolar plates 14, 16 may be etched or otherwise channeled to provide the flow distribution channels 32, 40.

The membrane layer 12 may have a thickness $t_1$, in the X direction, of at least 10 µm, such as at least 20 µm, or at least 40 µm, and may be up to 300 µm in thickness, or up to 100 µm. The membrane layer 12 may have a length L (longest dimension), in the Y direction, of at least 1 mm, such as at least 2 mm, or at least 5 mm, and may be up to 1 m in length. However, the length of the membrane is not limited. A ratio of membrane length to thickness $L:t_1$ may be at least 10:1 such as at least 50:1 or at least 10,000:1.

The polymer electrolyte membrane layer 12 includes a polymeric electrolyte material. The polymeric electrolyte material may be a fluoropolymer, or other ion permeable (e.g., proton-permeable), electrical insulating barrier material. Example fluoropolymers include perfluorosulfonic acid (PFSA)-modified tetrafluoroethylene, such as DuPont's range of Nafion® polymers, e.g., Nafion® XL, 112, 115, 117, and 1110 and Solvay's Aquivion® polymers, available in powder, pellet, and dispersion forms, e.g., Aquivion® PW98 Aquivion® PW87S and Aquivion® PW79S powders, Aquivion® D72-25BS, Aquivion® D79-25BS and Aquivion® D98-25BS dispersions, and Aquivion® P98 pellets. In the case of Aquivion® dispersions, the polymer concentration is 25% and the solvent system is >99% water and is free of ethers. Nafion®-based solutions are available at various polymer concentrations, such as Nafion™ 510211 perfluorinated resin solution (5 wt. % polymer in a mixture of lower aliphatic alcohols, containing 45% water), and Nafion™ 527122 perfluorinated resin solution (20 wt. % polymer in mixture of lower aliphatic alcohols, containing 34% water). As an example, Nafion® can be extruded or cast into thin films by heating in aqueous alcohol at 250° C. Polymer granules can also be generated by grinding the bulk polymer.

As minor components, the membrane layer may include free radical scavengers, antioxidants, and the like, which may be incorporated in the membrane-forming material.

The first and second catalyst layers 22, 24 may include catalyst particles, which may be embedded in or supported on the electrode material and/or membrane 12, e.g., dispersed in the same or a similar ionomer material to that used for the membrane 12. The catalyst may be a finely divided metal powder. The metal catalyst may be selected from (i) the platinum group metals (platinum, palladium, rhodium, ruthenium, iridium, and osmium), and/or (ii) gold or silver. Alloys or mixtures of catalytic metals with other metals or metal oxides are also contemplated. Examples of such other metals include ruthenium, molybdenum, tungsten, cobalt, chromium, nickel, iron, copper, and oxide thereof.

The same polymerizable electrolyte material (ionomer) as used to form the membrane 12, or a different ionomer, can be used to form the catalyst layers 22, 24.

A concentration of the catalyst particles in the fully-formed catalyst layers 22, 24 may be at least 1 wt. %, or at least 2 wt. %, or at least 5 wt. %, or at least 10 wt. %, or at least 20 wt. %, or at least 30 wt. %, or at least 40 wt. %, or at least 50 wt. %, or at least 60 wt. %, and may be up to 99 wt. %, or up to 98 wt. %, or up to 95 wt. %, or up to 90 wt. %. Expressed as vol. %, a concentration of the catalyst particles in the fully-formed catalyst layers 22, 24 may be at least 1 vol. %, or at least 2 vol. %, or at least 5 vol. %, or at least 10 vol. %, or at least 20 vol. %, or at least 30 vol. %, or at least 40 vol. %, and may be up to 70 vol. %, or up to 60 vol. %, or up to 50 vol. %. As will be appreciated, during formation of the catalyst layers 22, 24, the concentration of catalyst particles may be lower, due to the presence of solvent(s).

In combination, the catalyst particles and polymer (polymerized ionomer) may be at least 80 wt. %, or at least 90 wt. %, or at least 98 wt. %, and may be up to 100 wt. % of the catalyst layers 22, 24.

A ratio by weight of the catalyst particles to polymer in the catalyst layers 22, 24 may be at least 0.01:1, or at least 0.1:1, or at least 0.3:1, or at least 1:1, or at least 2:1, or at least 3:1, or up to 100:1, or up to 50:1, or up to 20:1, or up to 5:1.

In one embodiment, the catalyst particles are homogeneously dispersed in the catalyst layers 22, 24. In another embodiment, the catalyst particles are at different concentrations, in X and/or Y directions, in the catalyst layers, e.g., greatest nearest the membrane 12. In this embodiment, the concentration of the catalyst particles noted above may be the highest concentrations occurring in the catalyst layers 22, 24.

In one embodiment, the catalyst layers 22, 24 are each formed from two or more sublayers of different catalyst concentrations.

A concentration of the polymerized ionomer in the catalyst layers 22, 24 may be at least 2 wt. %, or at least 4 wt. %, or at least 5 wt. %, or at least 10 wt. %, and may be up to 60 wt. %, or up to 30 wt. %. In the embodiment in which the catalyst particles are not homogeneously dispersed in the polymer, the concentration of the polymerized ionomer noted above may be the lowest concentrations occurring in the catalyst layers 22, 24.

The catalyst layers 22, 24 may each have a thickness $t_2$, in the X direction, of at least 10 µm, or at least 30 µm, or at least 50 µm, or up to 300 µm, e.g., µm, between 50 and 300 µm in thickness, and the same length as the membrane layer.

Figure 2:
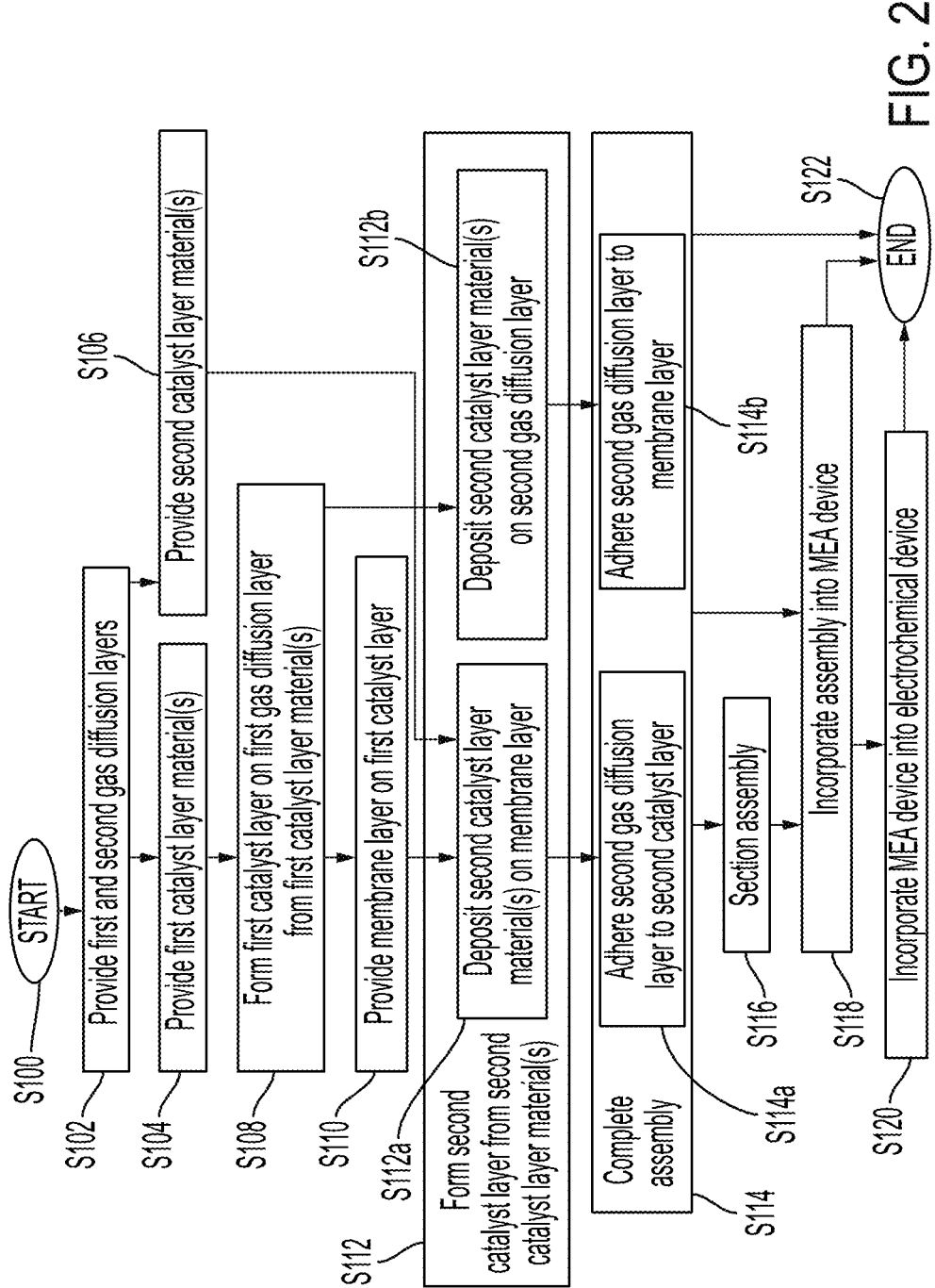
FIG. 2 is a flow chart which illustrates a method of making a membrane electrode assembly, in accordance with another aspect of the exemplary embodiment.
Figure 3:
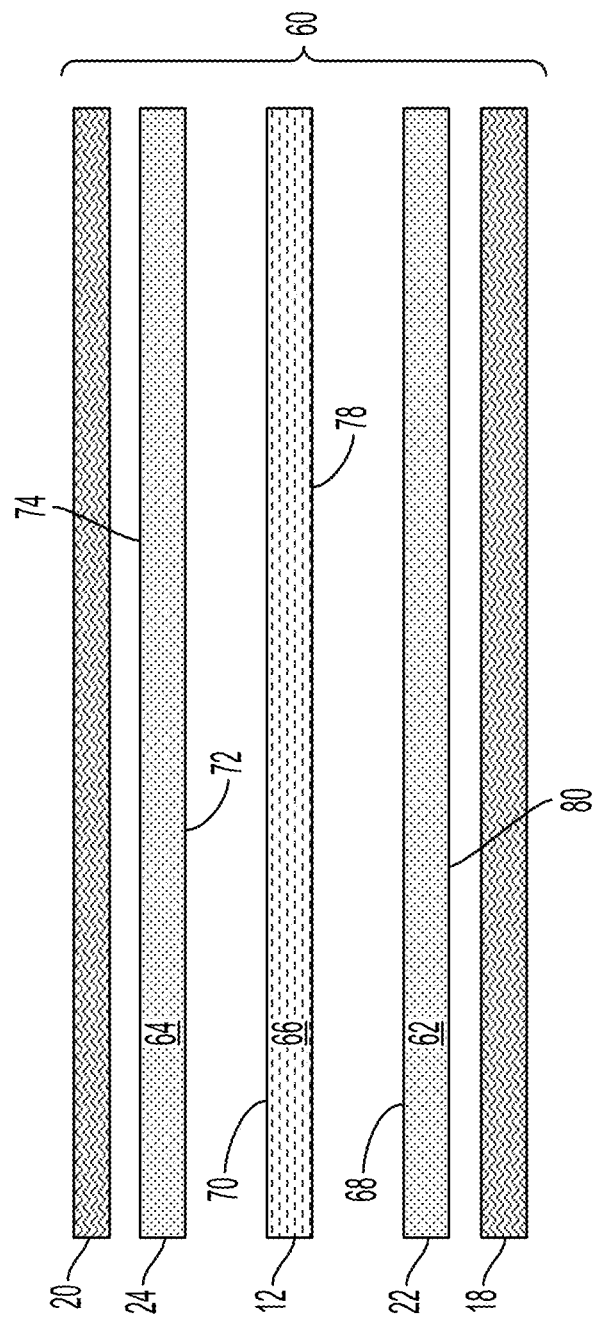
FIG. 3 is an exploded schematic cross sectional view of a multi-layer membrane assembly in accordance with another aspect of the exemplary embodiment.

In one embodiment, illustrated in FIG. 2, a method for forming a multilayer assembly 60 comprising layers 12, 18,

20, 22, 24, and a device 10 comprising the assembly, is provided. The method begins at S100. FIG. 3 illustrates the layers of the multilayer assembly 60 in exploded cross-sectional view.

At S102, first and second electrically-conductive gas diffusion layers 18, 20 are provided. In one embodiment, the first and/or second gas diffusion layers 18, 20 is/are coated with a polymer, such as a perfluorinated polymer such as PTFE, e.g., formed by FEA, to hydrophobize the surface and reduce a porosity of the gas diffusion layer(s) for improved water management. In one embodiment, the first and/or second gas diffusion layers 18, 20 is/are non-planar. This allows for a higher surface-area-to-volume ratio, which may increase packing density of cells in a stack configuration, providing space saving.

At S104, a first catalyst layer material 62 is provided for forming the first catalyst layer 22. The catalyst layer material 62 is in fluid form, specifically, in the form of atomized droplets, which consolidate to form a wet film. The exemplary first catalyst layer material 62 includes a molten polymer and optionally a solvent, in which a catalyst, e.g., in the form of a powder, is dispersed. In one embodiment, this step may include providing two or more first catalyst layer materials 62, each with a different catalyst to polymer ratio, by weight.

At S106, a second catalyst layer material 64 is provided for forming the second catalyst layer 24. The catalyst layer material 64 is in fluid form, specifically, in the form of atomized droplets, which consolidate to form a wet film. The exemplary second catalyst layer material 64 includes a molten polymer and optionally a solvent, in which a catalyst, e.g., in the form of a powder, is dispersed. In one embodiment, this step may include providing two or more second catalyst layer materials 64, each with a different polymer to catalyst ratio, by weight.

In one embodiment, the first and second catalyst layer materials 62, 64 include the same polymer and/or the same catalyst. When one or both of the catalyst layers 22, 24 is formed by FEA, the perfluorinated resin fluid or other catalyst layer materials 62, 64 used for forming the catalyst layers 22, 24 may be free or substantially free of solvent. By "substantially free" it is meant that the total solvent (combined organic solvent and/or aqueous solvent) in the catalyst layer materials 62, 64 is no more than 10 wt. %, or no more than 5 wt. %, or no more than 2 wt. %, or no more than 1 wt. %, or 0%, of the first and/or second catalyst layer materials 62, 64 used for forming the catalyst layers 22, 24. In other embodiments, the total solvent may be up to 98 wt. %, or up to 90 wt. %, or up to 80 wt. %, or up to 60 wt. %, or up to 50 wt. %, or up to 40 wt. %, or up to 30 wt. % or up to 20 wt. % or at least 1 wt. % of the first and/or second catalyst layer materials 62, 64.

The total concentration of perfluorinated resin and/or other ionomer(s) in the catalyst layer materials 62, 64, may be at least 5 wt. %, or at least 10 wt. %, or at least 20 wt. %, or at least 30 wt. %, or at least 40 wt. %, or at least 50 wt. %, and may be up to 90 wt. %.

The concentration of catalyst particles in the catalyst layer materials 62, 64 may be at least 5 wt. %, or at least 10 wt. %, or at least 20 wt. %, or at least 30 wt. %, or at least 40 wt. %, or at least 50 wt. %, or at least 60 wt. %, and may be up to 99 wt. %, or 98 wt. %, or up to 95 wt. %, or up to 90 wt. %, or up to 80 wt. %, or up to 60 wt. %.

The total solids concentration (primarily catalyst particles and perfluorinated resin and/or other ionomer(s)) in the catalyst layer materials 62, 64, may be at least 20 wt. %, or at least 30 wt. %, or at least 40 wt. %, or at least 50 wt. %, or at least 60 wt. %, or at least 70 wt. %, and may be up to 100 wt. %, or up to 90 wt. %. By "solids," it is meant the components which will remain in the formed layer, once any solvent has volatilized.

Example solvents include water, $C_1$-$C_6$ alcohols, such as methanol and propanol, and mixtures thereof. For example, a mixture of water and alcohol(s) in a weight ratio of from 20:1 to 1:20 may be employed.

Where the catalyst layers 22, 24 are composed of two or more sub-layers, the catalyst layer materials 62, 64 used for at least one of the sub-layers has a catalyst particle concentration and an ionomer concentration as described above.

The viscosity of the catalyst layer materials 62, 64 may each be at least 100 mPa·s, such as least 500 mPa·s, or at least 1000 mPa·s, or at least 10,000 mPa·s, or at least 50,000 mPa·s, or up to 250,000 mPa·s, or higher. However, lower viscosities are also contemplated, such as 20 mPa·s, or higher.

At S108, a first catalyst layer 22 is formed from the first catalyst layer material(s) 62. This may include sequentially depositing one or more layers of the first catalyst layer material(s) 62 on the first gas diffusion layer 18 by filament extension atomization (FEA), to form droplets, which are deposited on a substrate, such as the first gas diffusion layer 18. The first catalyst layer material(s) 62 may be heated and/or ultrasonically treated to form a viscous fluid and then atomized in an FEA device to form the droplets. In one embodiment, this step includes depositing a plurality of sub-layers of the first catalyst layer material(s) 62 at different catalyst to polymer ratios to provide a catalyst concentration gradient in the layer 22. The concentration of the catalyst may be highest in the sub-layer furthest from the first gas diffusion layer 18 or may be highest in an intermediate sub-layer. Each sub-layer may be deposited before the prior sub-layer has completely set to provide good interfacial bonding.

At S110, a membrane layer 12 is provided on the first catalyst layer 20, e.g., in direct contact with the first catalyst layer 20. In one embodiment, this may include depositing a membrane forming material 66 on an exposed upper surface 68 of the first catalyst layer material 62. In one embodiment, the membrane forming material 66 is deposited, e.g., in one or more layers, by filament extension atomization (FEA), to form droplets, which are deposited on a substrate, such as the first catalyst layer 22. In another embodiment, the membrane layer 12 is a preformed membrane. In this case, the preformed membrane 12 may be applied to the surface 68 of the catalyst layer before it has solidified, such that a strong interface is formed.

When the membrane layer 12 is formed by FEA, the membrane forming material 66 used for forming the membrane layer may include a molten thermoset polymer or a solution including a polymer and a solvent. The membrane-forming material may be free or substantially free of solvent. As for the catalyst layers, the total solvent (combined organic solvent and/or aqueous solvent) may thus be no more than 10 wt. %, or no more than 5 wt. %, or no more than 2 wt. %, or no more than 1 wt. %, or 0 wt. % of the membrane forming material 66. In other embodiments, the total solvent may be up to 50 wt. %, or up to 40 wt. %, or up to 30 wt. % or up to 20 wt. % of the membrane forming material 66. The membrane forming material 66 may be heated and/or ultrasonically treated to form a viscous fluid and then atomized in an FEA device. The membrane-forming material 66 may be at least 20 wt. %, or at least 30 wt. %, or at least 40 wt. %, or at least 50 wt. %, or at least 60 wt. %, or at least 70 wt. %, or at least 80 wt. %, or at least 90 wt. %, or at least 95 wt. % solids (primarily or exclusively ionomer(s)) and in some embodiments, may be up to 100 wt. % solids, or up to 90 wt. %, or up to 80 wt. %, or up to 70 wt. % solids.

At S112, a second catalyst layer 24 is formed from the second catalyst layer material(s) 64. In a first embodiment (S112a), this may include sequentially depositing one or more layers of the second catalyst layer material(s) 64 on the second gas diffusion layer 20 by filament extension atomization (FEA) in a similar manner to S108. This may include depositing a plurality of sub-layers of the second catalyst layer material(s) 64 at different catalyst to polymer ratios to provide a catalyst concentration gradient. The concentration of the catalyst in the layer 24 may be highest in the sub-layer furthest from the second gas diffusion layer 20 or may be highest in an intermediate sub-layer. Each sub-layer may be deposited before the prior sub-layer has completely set to provide good interfacial bonding.

In a second embodiment (S112b) step S112 may include sequentially depositing one or more layers of the second catalyst layer material(s) 64 on an exposed surface 70 of the membrane layer 12 by filament extension atomization (FEA). This may include depositing a plurality of sub-layers of the second catalyst layer material(s) 64 at different catalyst to polymer ratios to provide a catalyst concentration gradient. The concentration of the catalyst may be highest in the sub-layer closest to the membrane layer 12.

At S114, the multilayer assembly 60 is completed. In a first embodiment (S114a), this may include applying the catalyst layer 24 (pre-attached to the gas diffusion layer 20) to the exposed surface 70 of the membrane layer 12, before at least one of layers 12 and 24 is solidified on its exposed surface 70, 72 to provide good interfacial bonding. In a second embodiment (S114b), this may include applying the gas diffusion layer 20 to an exposed surface 74 of the catalyst layer 24 (pre-attached to the membrane layer 12, before layer 24 is solidified on its exposed surface 74, to provide good interfacial bonding.

Use of FEA to form droplets used in forming at least one of the membrane 12, first catalyst layer 22, and second catalyst layer 24 allows the layers to be firmly adhered to each other and cured, during or after assembly.

At S116, in the case where the assembly 60 is sized to be subdivided into two or more assemblies 60, the assembly 60 may be sectioned into suitably sized assemblies.

At S118, the method may further include incorporating the assembly 60 into a device, such as the device 10 shown in FIG. 1. This may include sandwiching the assembly between first and second bipolar plates 14, 16 with suitable gaskets, and electrically connecting the gas diffusion layers 18, 20 with respective electrodes 26, 28.

At S120, the thus-formed device 10 may be incorporated in a fuel cell or other electrochemical device which may incorporate two or more of assemblies 60/devices 10, and used to provide an electric current or to generate hydrogen gas, depending on the configuration of the device 10.

The method ends at S122.

As will be appreciated, the formation of the assembly 60 can proceed in a different order, e.g., with the second catalyst layer 24 being formed at S108, and so forth.

Figure 4:
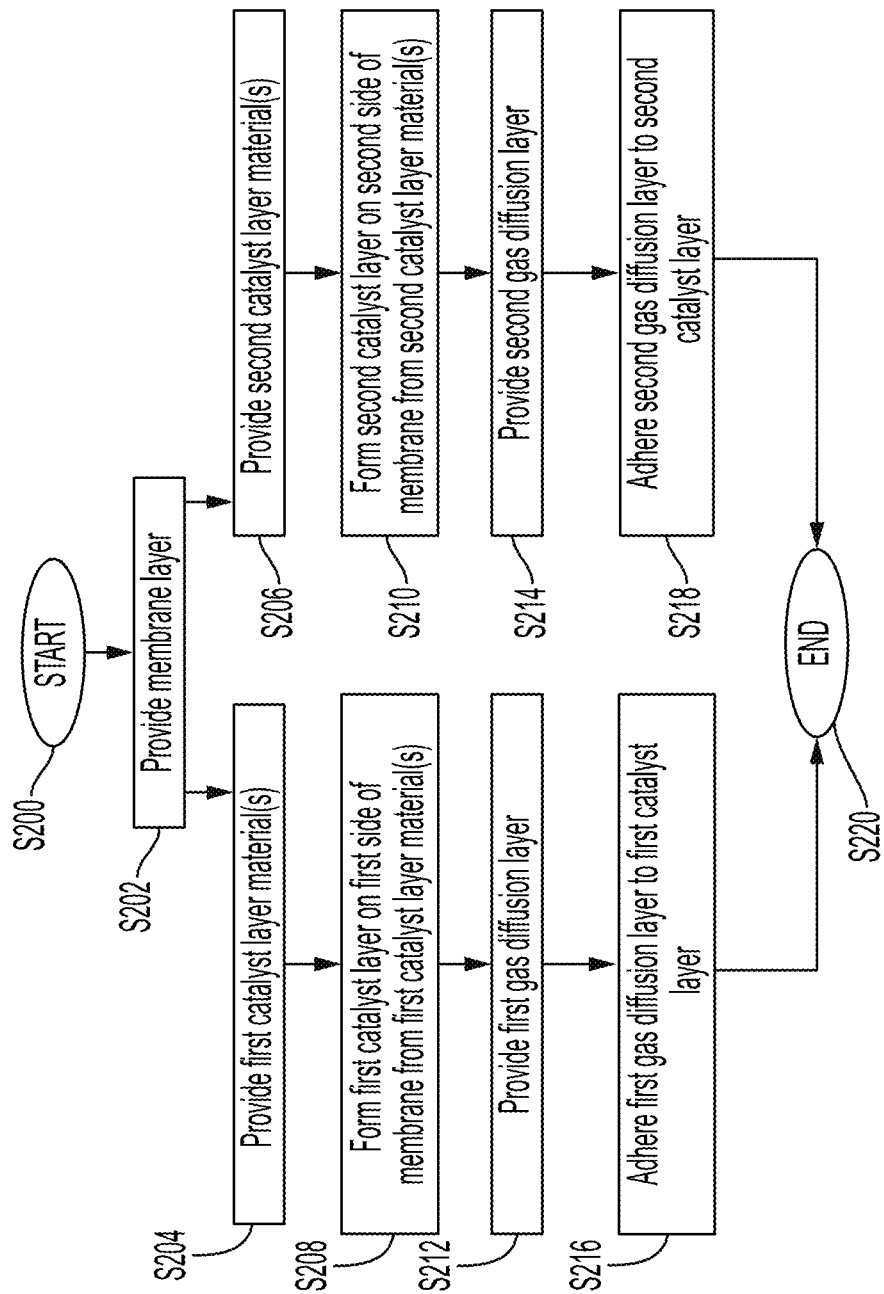
FIG. 4 is a flow chart which illustrates a method of making a membrane electrode assembly in accordance with another aspect of the exemplary embodiment.

In another embodiment of the method, illustrated in FIG. 4, the method may start at S200 and at S202, a membrane layer 12 is provided. In this case, the membrane layer 12 may have been previously formed, e.g., by FEA or other method. The membrane layer 12 defines first and second surfaces 78, 70, which may be generally planar (FIG. 3).

At S204 and S206, first and second catalyst layer forming materials 62, 64 are provided in fluid form, as described above for S104 and S106.

At S208 and S210, first and second catalyst layers 22, 24 are formed from the respective fluid catalyst layer materials 62, 64 (containing catalyst particles, polymer and optionally a solvent or solvents) on opposite sides 78, 72 of the membrane layer 12, in a similar manner to that described above for S112b, e.g., by FEA.

At S212 and S214, respective electrically-conductive gas diffusion layers 18, 20 may be provided. At S216 and S218, the gas diffusion layers 18, 20 are attached to the first and second catalyst layers 22, 24. In this embodiment, the diffusion layers 18, 20 may be adhered to the catalyst layers 22, 24 before their exposed surfaces 80, 74 are fully set, to create a strong interfacial bond.

The assembly 60 is now complete. The method may proceed to S118 of FIG. 2, or end at S220.

Figure 5:
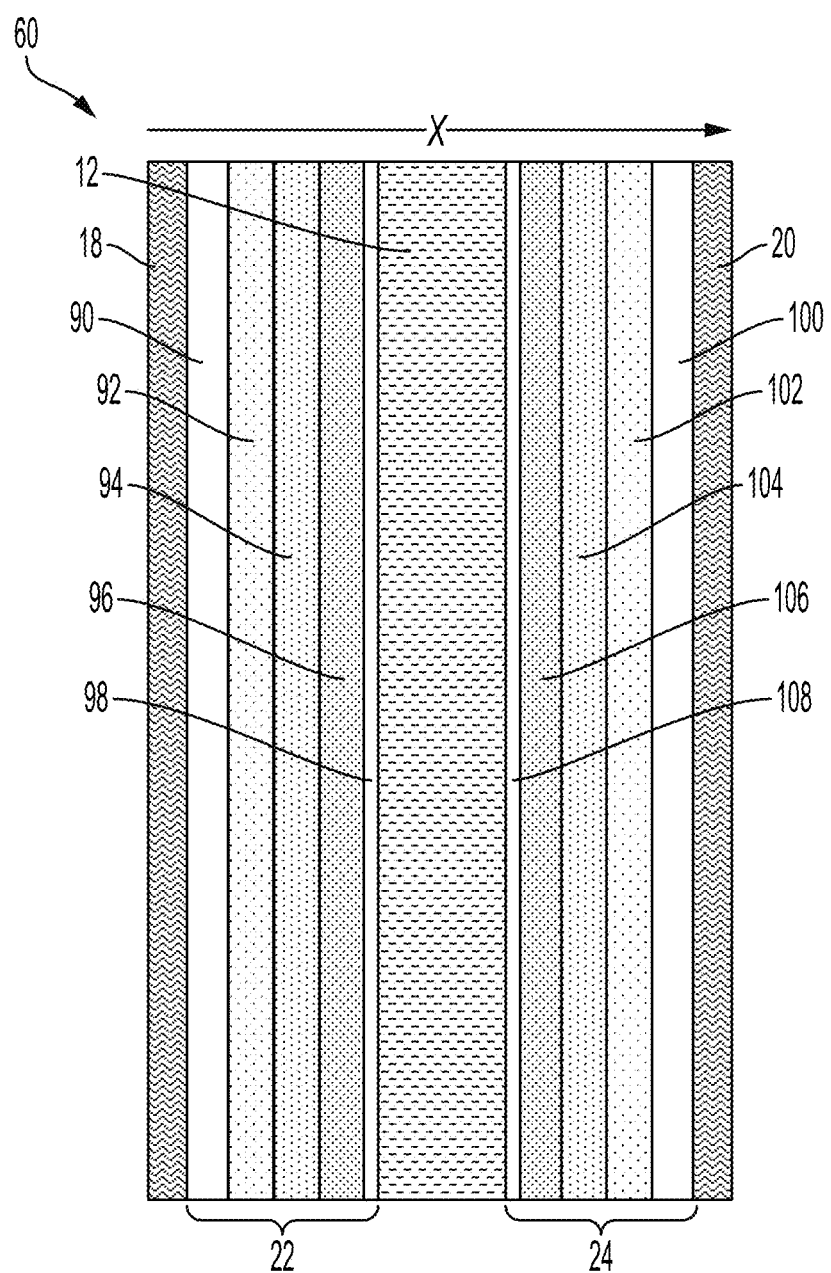
FIG. 5 is a schematic cross sectional view of a membrane assembly in accordance with another aspect of the exemplary embodiment.

With reference to FIG. 5, one embodiment of a membrane assembly 60 suited to use in the device of FIG. 1 is illustrated. In this embodiment, the catalyst layers 22, 24 each include multiple sub-layers 90, 92, 94, 96, 98 and 100, 102, 104, 106, 108, respectively. Each sub-layer is bonded to at least one other sub-layer. In one embodiment, the outer sub-layers 90, 100 (furthest from the membrane 12) are free or substantially free of catalyst. By "substantially free" it is meant that the catalyst concentration (grams of catalyst/grams of solid sub-layer) is no more than 20% of the catalyst concentration of one or more of the other sub-layers. The sub-layers may be of substantially uniform thickness, in the X-axis direction. In other embodiments, there may be discontinuities in the sub-layers, such that one layer extends through an adjacent one. In one embodiment, a concentration of catalyst increases, along the X axis, from the outer sub-layers 90, 100 towards the inner sub-layers 98, 108. For example, a catalyst:polymer ratio may be lowest for the outer sub-layers and highest for the inner sub-layers 98, 108 (adjacent to the membrane layer 12), progressively decreasing in the intermediate sub-layers. In another embodiment, a thin sub-layer 106, 108, which is free or substantially free of catalyst, may be positioned intermediate layer 96 or 106 and the membrane layer 12. Providing a layer which is free/substantially free of catalyst can reduce the possibility of catalyst particles damaging the membrane layer 12. In this embodiment, the catalyst concentration may be highest in intermediate sub-layers 96, 106. While five sub-layers are illustrated in each of the catalyst layers 22, 24, fewer or more sub-layers may be provided.

Figure 6:
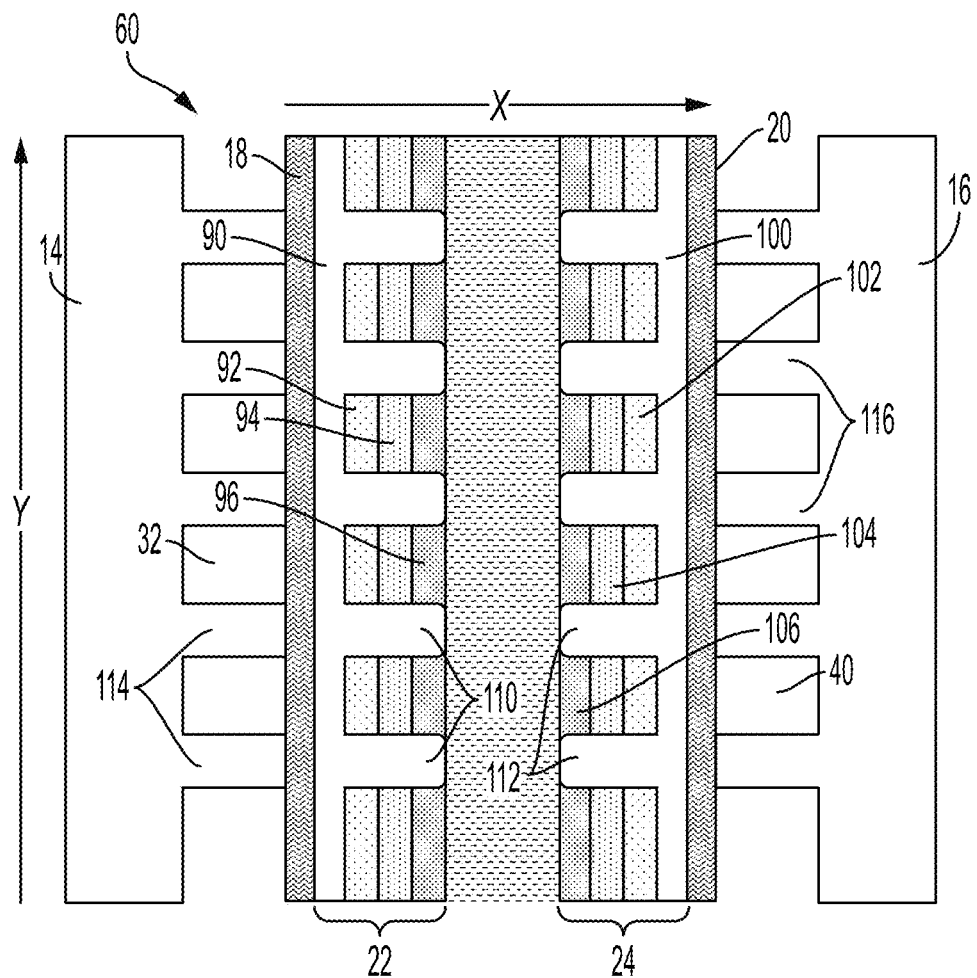
FIG. 6 is a schematic cross sectional view of a multi-layer membrane assembly in accordance with another aspect of the exemplary embodiment.

With reference to FIG. 6, another embodiment of a membrane assembly 60 suited to use in the device of FIG. 1 is illustrated. In this embodiment, the catalyst layers 22, 24 may each include one or more sub-layers 90, 92, 94, 96 and 100, 102, 104, 106, respectively, as for the embodiment of FIG. 5. In this embodiment, the catalyst concentration varies in at least the Y direction, i.e., perpendicular to the direction of flow of hydrogen ions. In particular, the catalyst concentration is lowest (catalyst:polymer ratio is lowest) in regions 110, 112, etc., of the layers 22, 24 where catalyzable moieties ($H_2$, $H^+$) are less likely to be present. In the exemplary embodiment, the bipolar plates 14, 16 include protruding portions 114, 116, which define the serpentine channels 32, 40 between them. The protruding portions 114, 116, etc., extend towards and generally contact the membrane assembly 60. As a result, gas/ion flow in adjacent regions 110, 112 of the catalyst layers is limited and catalyst in these regions can be omitted or reduced without compromising the efficiency of the membrane assembly 60. In this embodiment, catalyst layer materials 62, 64 of different (lower) catalyst concentrations are applied in regions 110, 112, etc., than in the regions adjacent to the serpentine paths 32, 40.

Figure 7:
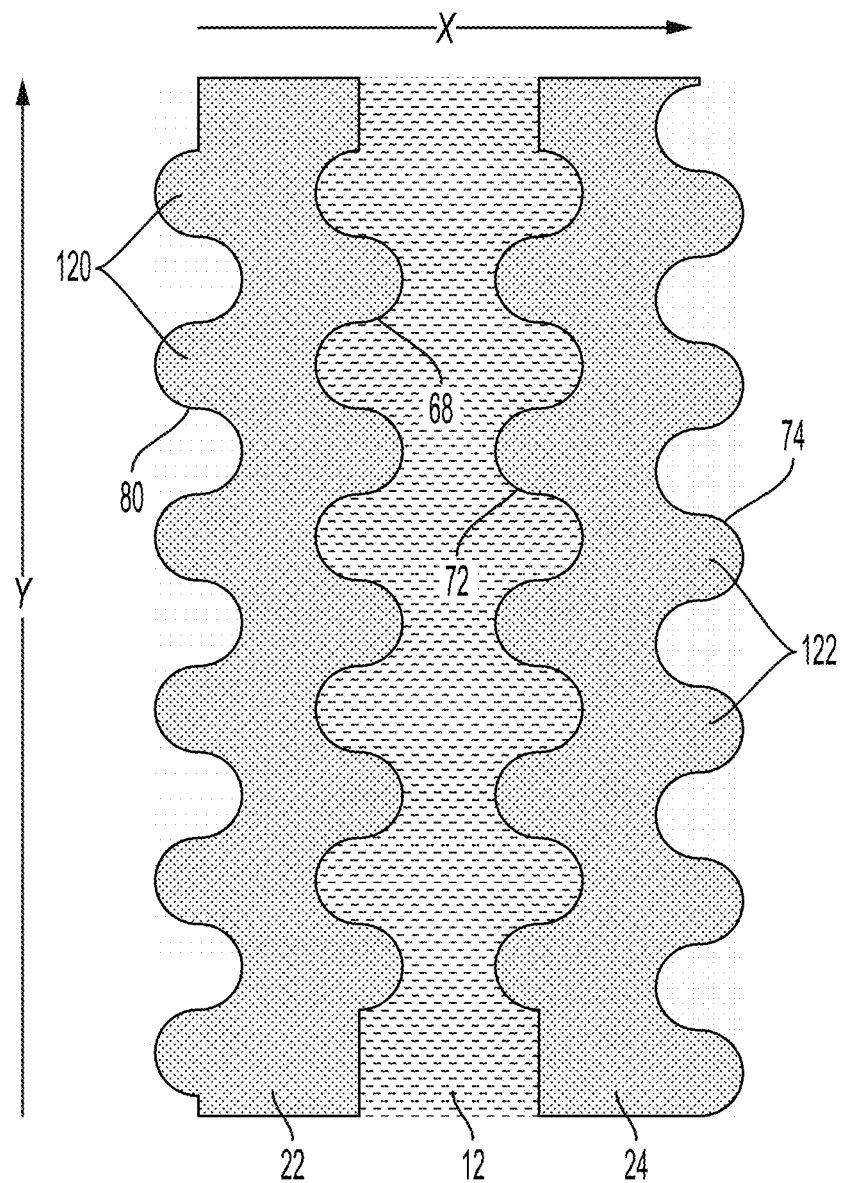
FIG. 7 is a schematic cross sectional view of a multi-layer membrane assembly in accordance with another aspect of the exemplary embodiment.

In another embodiment, rather than being planar, one or more of the catalyst layers 22, 24, membrane layer 12 and gas diffusion layers 18, 20 may be non-planar, e.g., as illustrated in FIG. 7. For example, the catalyst layers 22, 24 may have protrusions 120, 122 (exaggerated for ease of illustration), e.g., in the regions adjacent the protruding portions 114, 116 on the bipolar plates. Having an uneven surface increases the surface area of one or more of the layers 12, 22, 24, increasing the surface area of catalyst, thereby providing higher catalytic activity. The protrusions/unevenness of the surface(s) of the catalytic layers can be achieved by depositing more or less catalytic layer material at different Y-direction locations. Protrusions and/or depressions may be provided on one or both of the opposed sides 80, 68, 72, 74 of the catalyst layers 22, 24 and/or on the membrane layer 12. In another embodiment, the electrodes may be interdigitated.

Figure 8:
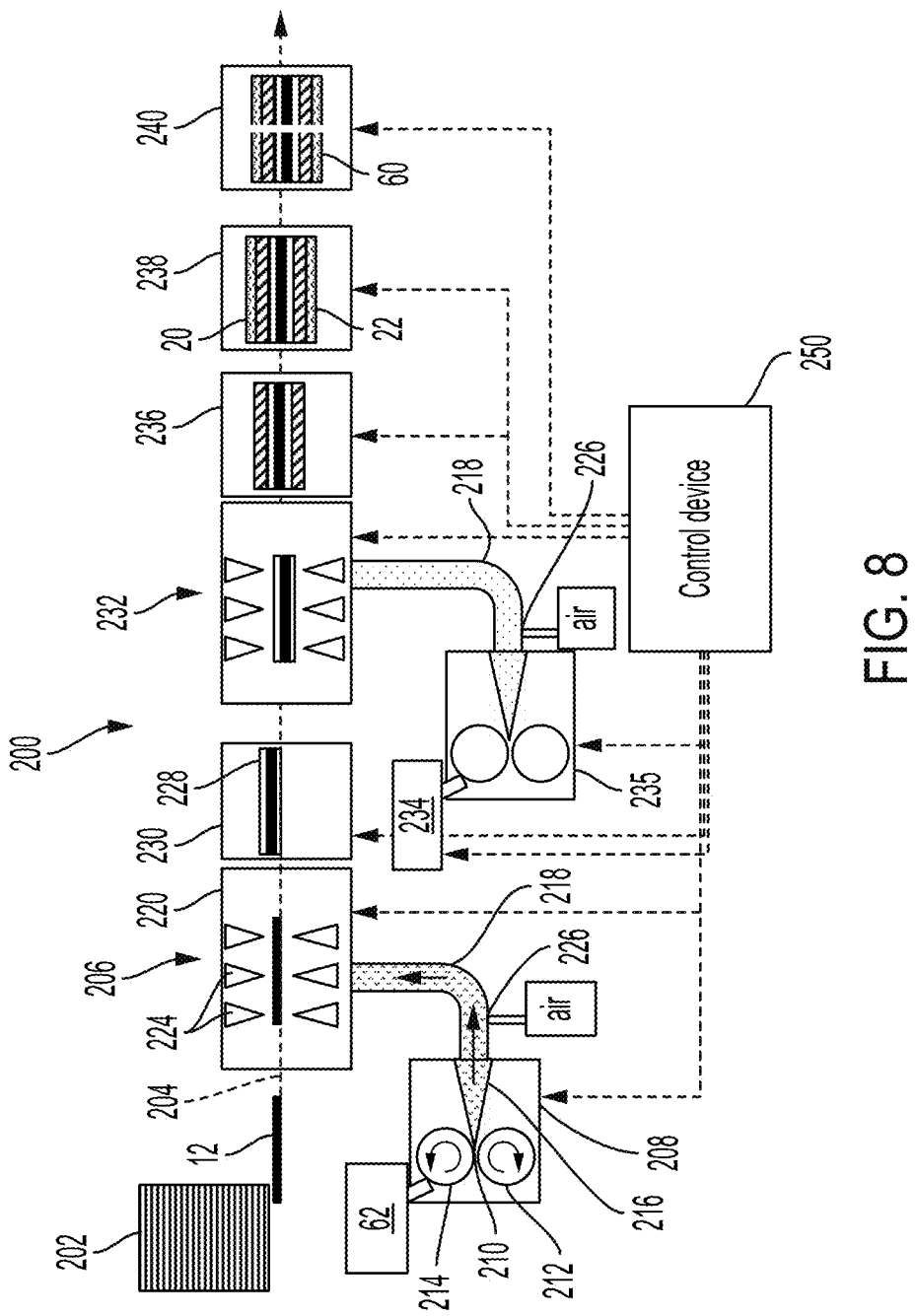
FIG. 8 is a block diagram illustrating an apparatus for forming a multi-layer membrane assembly in accordance with another aspect of the exemplary embodiment.

As previously noted, one or more of the layers 12, 22, 24 of the assembly 60 may be formed by filament extension atomization FEA. An exemplary filament extension atomization apparatus 200 is illustrated in FIG. 8. The apparatus 200 is configured for performing the method illustrated in FIG. 4, although it is to be appreciated that a similar apparatus could be configured for performing the method of FIG. 2. A supply station 202 supplies substrates, such as preformed membrane layers 12, to a transport system 204 (in the embodiment of FIG. 2, the supply station 202 may supply preformed gas diffusion layers 18, 20). The transport system 204 conveys the substrate layers 12 (manually or automatically) to a first catalyst layer applying station 206. A first filament extension atomizer 208 generates an aerosol, or droplets, of a heated first catalyst material 62 in fluid form, by stretching the fluid material 62 in a nip 210 (a small gap) defined between two rotating rollers 212, 214. The rollers 212, 214 stretch the first catalyst material 62 between the two diverging surfaces of the rollers 212, 214 as the rollers rotate away from each other. The fluid 62 pools on an upstream side of the nip 210 and is drawn into the nip as the rollers counter-rotate. On a downstream side, the fluid 62 is stretched into a filament between diverging surfaces of the rollers, to which a portion of the fluid still adheres. As the filament is stretched, the filament grows longer and thinner. When the filament reaches a point of instability, known as the capillary break-up point of the filament, the filament breaks into several droplets 216. As the rollers counter-rotate, continuous formation and break-up of filaments across the surface of the rollers 212, 214 generates the aerosol of fluid droplets 216. The aerosol of fluid 62 is then directed along a passage 218 to a chamber 220 of the catalyst layer applying station 206, where the droplets are deposited through outlets 224 (such as funnels) on to the passing substrate 12. The funnels may be assisted by a shaping air flow to direct the aerosol stream better. In one embodiment, the same catalyst layer material 62 is applied to both sides of the membrane layer 12 (i.e., also serves as the second material 64), although in other embodiments, different materials 62, 64 may be applied by respective catalyst layer applying stations. In the case where the catalyst layer material is applied to the gas diffusion layers 18, 20, different pathways 204 with respective stations 206 may be provided, with the first gas diffusion layer 18 being coated, on one side only, with the first catalyst layer material 62, and the second gas diffusion layer 20 being coated, on one side only, with the second catalyst layer material 64.

The catalyst layer material(s) 64 may be formed from an ionomer in the form of granules, pellets, powder, or other suitable form. In one embodiment, the ionomer is composed mainly of a polytetrafluoroethylene (PTFE) backbone with side chains containing ether groups and a sulfonic acid unit at its end, such as Nafion® polymer, which is heated in an autoclave before or after addition of the catalyst particles.

It is to be appreciated that alternative forms of a filament extension atomizer 208 can be used, other apparatuses utilize alternate means of creating diverging surfaces, including co-rotating rollers, a single roller and a belt or other linear surface, a system of one or two pistons which stretch a filament between a piston and another piston or other surface and other alternative apparatuses capable of stretching a fluid filament between one or more diverging surface.

In one embodiment, the droplets 216 are directed by a flow of cooling gas, such as a pressurized air stream, which may be introduced to the passage 218 at 226. The air stream cools the aerosol, preparing the formed aerosol droplets for deposition onto the substrate 12 and inhibiting agglomeration of the droplets by solidifying an outer surface of the droplets. As the aerosol passes through the passage 216, and/or upon entering the chamber 220, the droplets can be electrostatically charged. The charged droplets are attracted to the electrically grounded, or oppositely charged, substrate 12 due to the electrostatic potential between the droplets of the aerosol and the substrate. The electrostatic potential between the charged aerosol and the substrate 12 attracts a thin layer of the fluid 62, 64 to the substrate surface. As the electrostatically charged fluid 62, 64 is deposited onto the substrate 12, the magnitude of the electrostatic potential between the two materials is reduced. The thickness of the coating can be varied and adjusted as desired by varying the magnitude of the electrostatic potential between the droplets and substrate. The greater the electrostatic potential, the more deposited fluid 62, 64 is required to reduce electrostatic potential.

In one embodiment, the apparatus 200 may provide for teflonization of microporous layers, such as the gas diffusion layers, e.g., by spraying a PTFE solution at a desired polymer concentration. The PTFE solution may be introduced to the atomizer 208 from a suitable supply vessel (not shown), e.g., prior to introduction of the catalyst layer forming material 62.

The thus-formed coated substrate 228 may be transported to a first curing station 230 that at least partially cures the catalyst layer or layers 22, 24. Curing the substrate 12 and deposited coating material 62, 64 can include a thermal curing process, a photo-curing process, a chemical curing process, other curing processes, and combinations thereof. Curing can cause the deposited coating material 62, 64 to polymerize and cross-link into the final catalyst layer or sub-layer. In one embodiment, the substrate 12 and deposited coating material 62 are heated, causing the (partially) solidified droplets to melt across the surface of the substrate 12, thus coating the surface of the substrate with the coating material.

In one embodiment, the curing station 230 only partially, but not fully, cures the ionomer in the catalyst layer material 62.

In one embodiment, the coated substrate 228 may be transported to a second (and optionally a third, or more) catalyst layer applying station(s) 232. The second station 232 may be similarly configured to first catalyst layer applying station 206, except in that the heated first catalyst material 62 is replaced by a heated second catalyst material 234, atomized by a second filament extension atomizer 235, analogous to atomizer 208. The second catalyst material 234 may have a different catalyst concentration from the first catalyst material 62. This allows sub-layers of the catalyst layers 22, 24 to be progressively applied on the membrane 12 (or on gas diffusion layers 18, 20), at different catalyst concentrations, as illustrated in the embodiment of FIG. 5.

A second curing station 236, downstream of the second catalyst layer applying station 232, may be similarly configured to the curing station 230. In one embodiment, the second curing station 236 only partially, but not fully, cures the ionomer in the second catalyst layer material 234. In one embodiment, the first curing station 230 may be omitted.

Optionally, a gas diffusion layer applying station 238 applies the gas diffusion layers 18, 20 to the catalyst layer(s) 22, 24 to complete the assembly 60. The applying station 238 may include a laminator or similar device.

In the embodiment of FIG. 2, where the substrate is a gas diffusion layer 18, 20, station 238 may apply the membrane layer to one of the coated gas diffusion layers, e.g., by FEA, and clamp the other of the coated gas diffusion layers to the membrane layer to form the assembly 60.

Optionally, a slitter station 240 slits the assembly 60 to form a plurality of assemblies.

In another embodiment, not illustrated, the first catalyst layer applying station 206 may include two or more sources of the catalyst material 62, at different catalyst concentrations, to be successively introduced to the first filament extension atomizer 208 to form sub-layers at different catalyst concentrations.

In another embodiment, the catalyst is introduced at different rates to the heated ionomer before it enters the FEA 208, to provide the sub-layers.

In another embodiment, where the substrate is one of the gas diffusion layers 18, 20, the second (or a subsequent) applying station 232 may apply the material for forming the membrane layer 12 by FEA.

Some or all of the components 204, 206, 208, 230, 232, 235, 236, 238, 240 of the apparatus 200 may be controlled by a common control device 250. The control device may include on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like.

The exemplary MEA device 10 finds particular use in power sources for road vehicles, space vehicles, and for home and industrial electrical power generation. When used as an electrolyzer, the exemplary MEA 10 finds particular use when coupled to an intermittent power source such as a wind turbine or solar power array. The MEA electrolyzes hydrogen using excess electricity provided by the power source 50 when the power source is operational. The MEA device 10 consumes the hydrogen to produce electrical power when the intermittent power source is inoperative.

The exemplary MEA assembly 60 is thus formed, at least in part, using a Filament Extension Atomizer spray device that generates an aerosol of droplets by introducing a heated polymer and, in the case of catalyst layers, catalyst particles, at much higher solids concentration (polymer plus any catalyst), by weight, than can be achieved by conventional methods of forming layers 12, 22, 24. This provides advantages in increasing design latitude for creating membranes and catalyst layers which are bonded firmly together. The higher solids concentrations possible in the layer-forming materials also allows greater control over layer thickness.

The fabrication of a complete MEA 60, or fabrication of parts of the MEA can be achieved using a single FEA spray coating device, e.g., by controlling the catalyst to polymer ratio supplied to the atomizer 208.

The apparatus and methods described herein enable fast, inexpensive large scale manufacturing of MEAs with better electrochemical performance than the conventionally produced ones due to the improved triple phase boundary. The system and method also enable fabrication of gradient ionomer and catalyst layers, allowing spraying of molten ion exchange polymers and particle loadings of up to 50 wt. %, or more, which is currently not feasible using conventional nozzle sprayers.

The apparatus and method can also allow tunable teflonization of microporous layers by spraying a PTFE solution at a desired polymer concentration. Teflonization helps with water management and tuning of the pore size for more homogeneous gas flow.

EXAMPLES

A first catalyst layer material 62 is prepared at 50 wt. % solids and 50 wt. % solvent, the solids composed of 30 wt. % of dry Nafion™ ionomer (based on Nafion™ D520, obtained from FuelCellStore) and 70 wt. % Platinum/Carbon particles, the solvent being a mixture of methanol and water (MeOH:$H_2O$ of 3:1, by weight).

A second catalyst layer material 62 is prepared at 2 wt. % solids and 98 wt. % solvent, the solids composed of a 2 wt. % Nafion™ ionomer (based on Nafion™ D520, obtained from FuelCellStore) and 98 wt. % $IrO_2$ particles, the solvent being a mixture of 2-propanol and water (2-propanol:$H_2O$ of 1:1, by weight).

A third catalyst layer material 62 is prepared at 12 wt. % solids and 88 wt. % solvent, the solids composed of a 20 wt. % Nafion™ ionomer (based on Nafion™ D520, obtained from FuelCellStore) and 80 wt. % $IrO_2$ particles, the solvent being a mixture of 2-propanol and water (2-propanol:$H_2O$ ratio of 1:1, by weight).

Each of the catalyst layer materials are sprayed by FEA on a respective substrate, serving as a membrane, exhibiting good adherence.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for forming a multilayer assembly comprising:
   providing a first catalyst layer in contact with a first side of a polymer membrane, the first catalyst layer being formed from a first layer-forming material comprising a polymer and catalyst particles, dispersed in the polymer, the first layer-forming material further comprising at least one solvent, wherein a total solvent is no more than 10 wt. % of the first layer-forming material;
   providing a second catalyst layer in contact with an opposed second side of the polymer membrane, the second catalyst layer being formed from the first layer-forming material or from a second layer-forming material comprising a polymer and catalyst particles, dispersed in the polymer;

wherein at least one of the first catalyst layer, the second catalyst layer, and the polymer membrane is formed by filament extension atomization of a fluid material to form atomized droplets that are sprayed to form the respective membrane or layer.

2. The method of claim 1, wherein the total solvent is no more than 5 wt. % of the first layer-forming material.

3. The method of claim 1, wherein the first layer-forming material is sprayed onto one of the membrane and a microporous layer.

4. The method of claim 1, wherein the first catalyst layer comprises at least two sub-layers of a controllable thickness, a first of the sublayers having a higher concentration of the catalyst particles than a second of the sublayers.

5. The method of claim 1, further comprising varying a concentration of catalyst particles in the first catalyst layer in a direction parallel to a thickness of the membrane.

6. The method of claim 1, further comprising varying a concentration of catalyst particles in the first catalyst layer in a direction perpendicular to a thickness of the membrane.

7. A method for forming a multilayer assembly comprising:

providing a first catalyst layer in contact with a first side of a polymer membrane, the first catalyst layer being formed from a first layer-forming material comprising a polymer and catalyst particles, dispersed in the polymer;

providing a second catalyst layer in contact with an opposed second side of the polymer membrane, the second catalyst layer being formed from the first layer-forming material or from a second layer-forming material comprising a polymer and catalyst particles, dispersed in the polymer;

wherein the polymer membrane is formed by filament extension atomization of a membrane-forming material to form atomized droplets that are sprayed on at least one of the first and second catalyst layers, the membrane-forming material comprising a molten thermoset polymer.

8. The method of claim 1, wherein an interface between the first catalyst layer and the membrane is non-planar.

9. The method of claim 1, further comprising adhering the first catalyst layer to a first microporous layer and adhering the second catalyst layer to a second microporous layer.

10. The method of claim 9, further comprising coating the first microporous layer with a fluoropolymer layer formed by filament extension atomization of a fluid fluoropolymer material prior to adhering the first catalyst layer to a first microporous layer.

11. The method of claim 1, wherein the polymer membrane is proton-permeable.

12. The method of claim 1, further comprising incorporating the multilayer assembly into a membrane electrode assembly, the membrane electrode assembly comprising first and second electrodes spaced by the multilayer assembly.

13. The method of claim 1, wherein:

the filament extension atomization of the first catalyst layer forming material is performed with a first filament extension atomizer which generates an aerosol from the first catalyst layer forming material in fluid form, by stretching the fluid material in a nip defined between rotating rollers; and forming the first catalyst layer with a first applying station which receives the aerosol, the first applying station including outlets which deposit droplets of the aerosol on a substrate to form the first catalyst layer, the substrate comprising one of a microporous layer and the polymer membrane;

the first applying station, or a second applying station, applying the other of the microporous layer and the polymer membrane to the first catalyst layer.

14. The method of claim 1, wherein:

the polymer and catalyst particles comprise at least 20 wt. % of the first catalyst layer material;

the method further comprising:

adhering a first microporous layer to the first catalyst layer; and curing the first catalyst layer material.

15. A method for forming a multilayer assembly the multilayer comprising first and second microporous layers, a polymer membrane, a first catalyst layer in contact with a first side of the polymer membrane and a second catalyst layer in contact with a second side of the polymer membrane, the method comprising:

spraying atomized droplets formed by filament extension atomization of a first layer-forming material to form a first catalyst layer on one of the first microporous layer and the first side of the polymer membrane, the first layer-forming material comprising a polymer and catalyst particles, dispersed in the polymer, the first layer-forming material comprising no more than 10 wt. % of solvent; and spraying atomized droplets formed by filament extension atomization of a second layer-forming material to form the second catalyst layer on one of the second microporous layer and the second side of a polymer membrane, the second layer-forming material comprising a polymer and catalyst particles, dispersed in the polymer, the second layer-forming material comprising no more than 10 wt. % of solvent.

* * * * *